Nov. 9, 1965          L. M. PUSTER          3,216,409

ENGINE SAFETY CONTROL SYSTEM, METHOD, AND CONTROLLER THEREFOR

Filed April 9, 1963          4 Sheets-Sheet 1

INVENTOR.
LOUIS M. PUSTER

BY

HIS ATTORNEYS

United States Patent Office 3,216,409
Patented Nov. 9, 1965

3,216,409
ENGINE SAFETY CONTROL SYSTEM, METHOD, AND CONTROLLER THEREFOR
Louis M. Puster, Knoxville, Tenn., assignor to Robertshaw Controls Company, a corporation of Delaware
Filed Apr. 9, 1963, Ser. No. 271,781
13 Claims. (Cl. 123—179)

This invention relates to an engine safety control system and controller therefor.

According to this invention, an engine control system is provided, which has a unitary safety controller capable of stopping the operation of the engine if one or more variable conditions of the engine become unsafe.

The controller may be used with one or more engine condition responsive members or sensors which transmit their unsafe condition response to the controller which then stops the engine by reason of such transmittal from the condition responsive members.

The unitary controller may be manually reset to be responsive to stop the engine when any one of such variable conditions becomes unsafe. The controller may be manually reset by a single manipulator or button the actuation of which renders the controller ready to safeguard the operation of the engine.

The condition responsive member or members may be responsive to unsafe conditions of one or more variable conditions, such as the speed of the engine, the temperature of the engine cooling system, the pressure of the lubricating oil in the engine lubricating system, and any other similar variable engine condition.

The control system and the controller may become effective to stop the engine when any of said one or more variable engine conditions becomes unsafe. For example, the engine may be stopped when the speed of the engine and/or the temperature of the cooling system become excessive or unsafe. The engine may also be stopped by the controller when the lubricating oil pressure becomes low and unsafe during normal running conditions of the engine.

The system and/or the controller may be such that the engine is not stopped during engine starting or cranking operations when a variable has an unsafe condition during such starting operations, such as when the lubricating oil pressure is low. This feature may be incorporated either inside or outside the controller.

The controller is so arranged and constructed that it may be manufactured efficiently and in a workmanlike manner, and so it is not subject to faulty manufacture. The controller may be readily and effectively manufactured by modern manufacturing techniques.

Many other features and advantages are apparent from this description, the appended claimed subject matter, and/or the accompanying drawings, in which:

FIGURE 1 is a diagrammatic representation of a system of safety control for an internal combustion engine and the like.

According to this invention, a unitary controller 100 is provided, which has a manipulating means such as a reset push button or manipulator 114.

Figure 1:
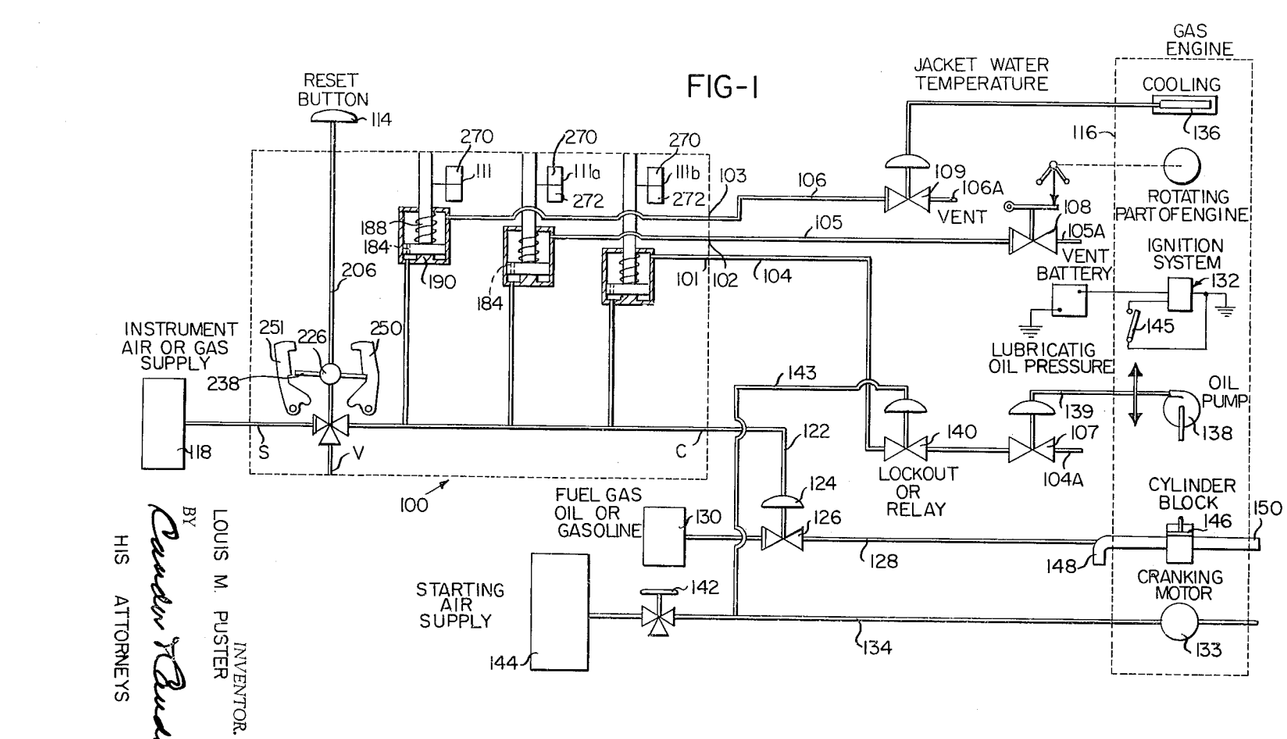
Figure 2:
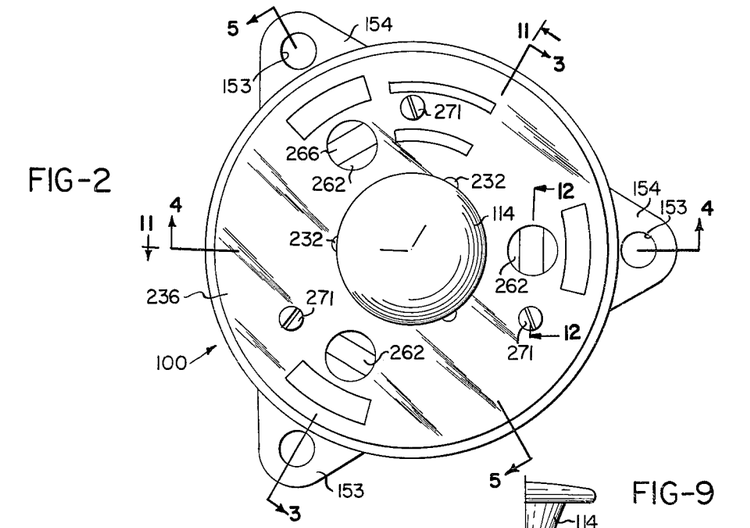
FIGURE 2 is a top view of a unitary controller for a system, such as shown in FIGURE 1.

When the push button 114 is down, the unitary controller 100 feeds instrument or control air from any suitable supply 118 through the lines 104, 105, 106 and 122. The air pressure in line 122 causes fuel to be fed through line 128 to the engine 116. Venting of any of the lines 104, 105, 106 through the vents 104A, 105A and 106A because of unsafe conditions in the engine causes the unitary controller 100 to be tripped to unset position with the button 114 in the up position. This unset position shuts off the air supply to line 122 and shuts off the fuel feed to the engine 116 and stops the engine. This unitary control 100 may be used, for example, with any internal combustion engine 116, which engine may be cranked by the cranking air motor 133 in combination with a manually openable cranking air valve 142. When the engine 116 is to be started, the valve 142 is opened, and this causes the cranking motor 133 to crank the engine. Preferably it is desirable to allow a short cranking period while the ignition system 132 is grounded by the closed grounding switch 145. This initial cranking will permit the piston assembly 146 to pump purging air from the air intake 148 and discharge it through the exhaust 150 to purge the engine from any residual gas, etc. While the engine 116 continues to be cranked, the manipulator or reset button 114 may be pushed and held down for a proper length of time to insure proper running operation of the engine. When the button 114 is pushed down control fluid, such as pressure instrument air is fed to line 122. The fuel valve 126 is opened by this action, and causes fuel gas or the like to be fed through the line 128, to be mixed with combustion air from intake 148. At the same time ignition switch 145 is opened to actuate the ignition system, and causes the fuel mixture to be ignited in the piston and cylinder construction 146 to operate the engine.

The push button 114 is held down sufficiently long to insure that the engine has been properly started, and that the lubricating oil pressure has been built up to a safe operating condition. However, when additional improvements are provided, such as the lockout valve 140 or the auxiliary lever 278 (to be described), then the push button may be momentarily pushed down and then released before the oil pressure has become safe. After the push button has been released, it is held down by latching means to be described. When the oil pressure has become safe, the starting air valve 142 may be closed. The push button 114 will then remain latched in a down reset position as long as the variable engine conditions which are to be sensed or monitored by the system do not become unsafe. If any one of the variable engine conditions becomes unsafe then the unitary control 100 will be tripped by the venting of control fluid at any one or more of the vent outlets 104A, 105A, 106A of the monitoring or sensing members or valves 107, 108, 109 to release the upwardly spring biased push button 114 and allow it to move up to its released or unset position, whereupon the instrument air line 122 has its pressure reduced by the venting action of the unit or control 100. This closes the fuel valve 126 and stops operation of the engine 116.

While instrument air has been described as the control medium by which the control unit 100 controls the operation of the engine 116, any other suitable energy medium may be used, such as a control fluid which may be any gas, liquid, etc.

The unitary controller 100 may have a control fluid supply port S, one or a plurality of control fluid discharge sensor ports 101, 102, 103, which also are latch controlling ports. The controller also may have a control fluid discharge port, such as a fuel control port C, and a control fluid discharge vent port V. A conduit construction may be provided in the controller for connecting these ports, such as the conduits, cavities, etc., indicated at 116′, 160, 174, 175, 198, 199, etc., as in FIGURES 3, 5, etc. A valve construction may be provided to control the flow of control fluid between the ports, and such valve construction may include the spring biased poppet valve assembly 158 including the poppet valve 164, and its cooperating parts to be described.

The valve construction, in one or first position or condition, such as shown in FIGURES 3–6, controls the conduit construction to connect the supply port S with the sensor ports 101, 102, 103 and the fuel control port C while isolating or disconnecting the vent port V, to cause monitored or sensed control of the engine 116.

Figures 5, 11:
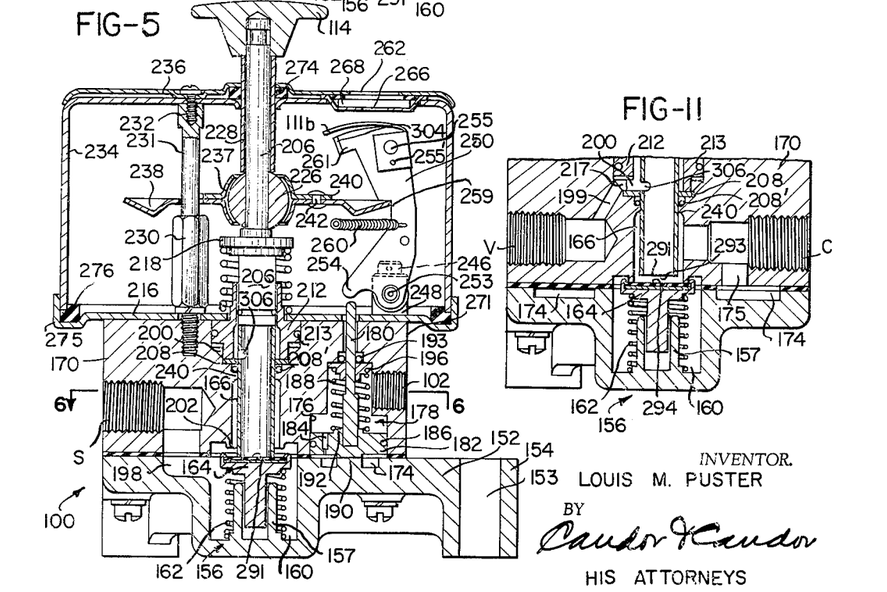
FIGURE 11 is a vertical cross section of a portion of the controller along the angled vertical plane of line 11—11 of FIGURES 2 and 6.
Figures 6, 7, 8, 10:
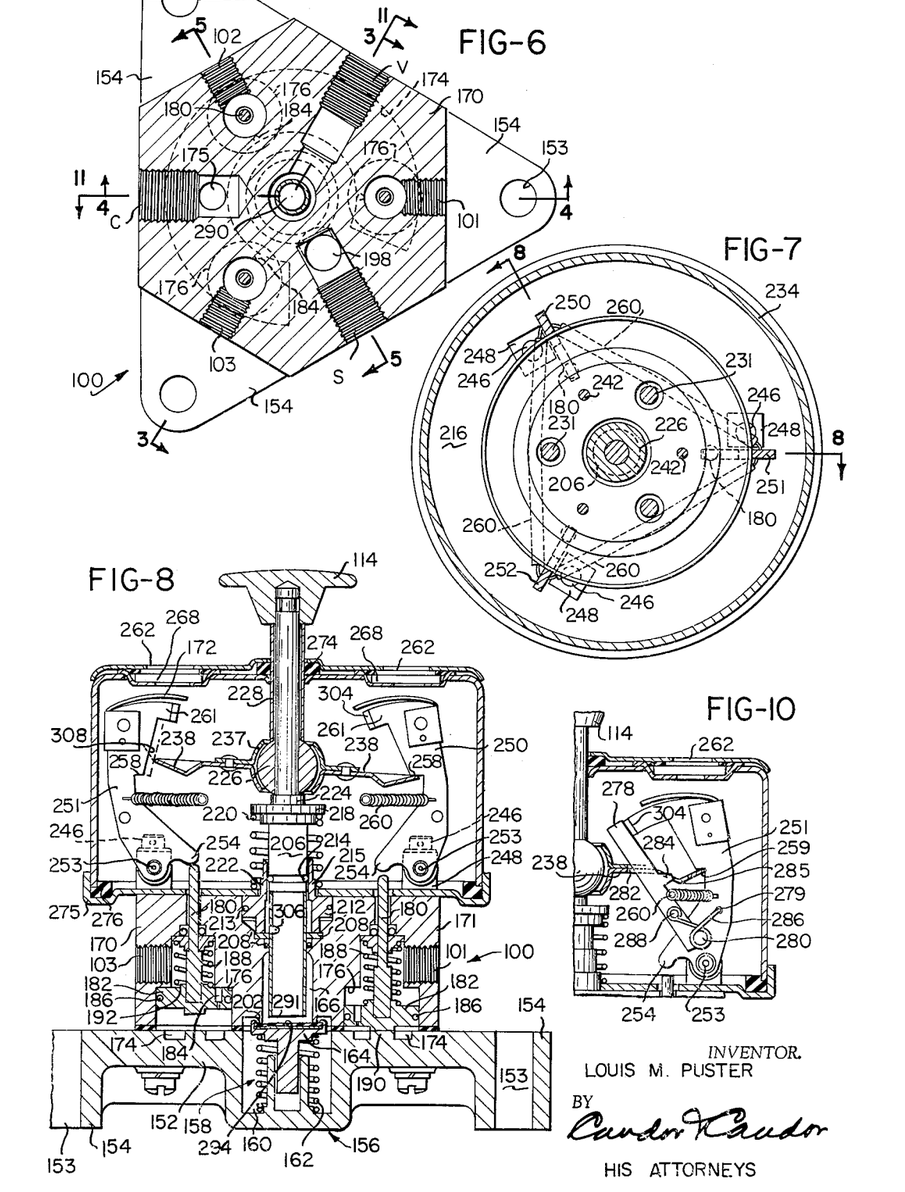
FIGURE 6 is a horizontal cross section taken generally along an irregular horizontal plane, such as indicated by the lines 6—6 of FIGURES 3, 4 and 5.
FIGURE 7 is a horizontal cross section taken generally along the line 7—7 of FIGURE 3.
FIGURE 8 is a vertical cross section taken along an angled vertical plane, such as indicated by the line 8—8 of FIGURE 7, and showing the controller in a released condition.
FIGURE 10 shows a portion of FIGURE 9 with parts in a different position.

The valve construction, in another or second position or condition, such as shown in FIGURES 8 and 11, causes the conduit construction to connect the vent port V with the sensor ports 101, 102, 103 and with the fuel control port C while isolating or disconnecting the supply port S to vent the control system and to close the fuel valve 126 and stop the engine 116.

Figure 3:
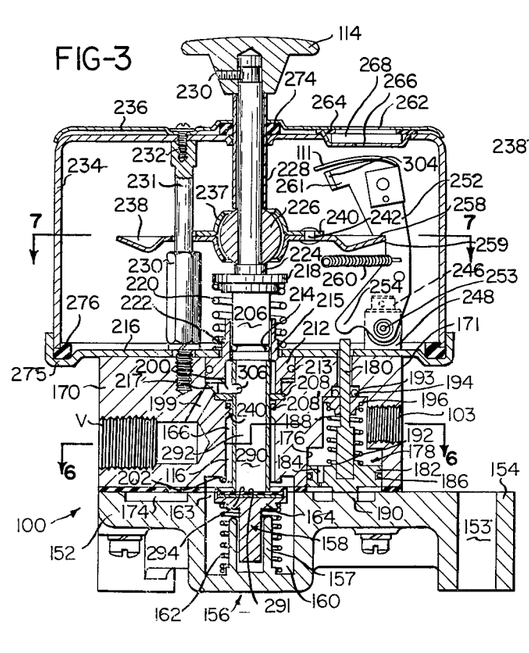
FIGURES 3, 4 and 5 are vertical cross sections taken generally and respectively along the lines 3—3, 4—4 and 5—5 of FIGURE 2 and FIGURE 6.
Figures 4, 12:
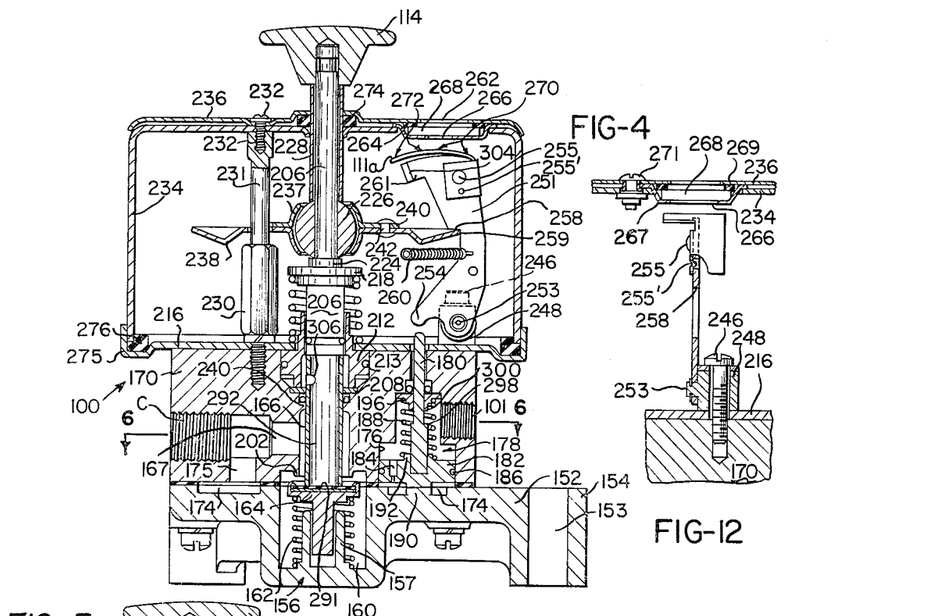
FIGURE 12 is a vertical cross section of an upper portion of the controller taken generally along the line 12—12 of FIGURE 2.

The unitary controller 100 is such that its manipulator or knob 114 may be manually moved from its released or tripped position, as shown in FIGURE 8, to its reset position, such as shown in FIGURES 3–5, where the manipulator will be latched to hold the controller 100 in condition to monitor or guard the operating engine 116 against the unsafe variable conditions. If any one or more of these conditions should become unsafe, the manipulator construction will be tripped or unlatched to return to its released position of FIGURES 8 and 11. This will vent or reduce the pressure of the control fluid, close the fuel valve 126, and stop the engine 116.

The controller 100 may have a control body construction having the central body section 170, the latch containing body section 234 at one end of the central body section 170, and a distributing conduit section 152 at the other end of said central body section 170. The section 152 may have the distributing conduit 174 and a central cavity 160 sealed by the central section 170. The body section 170 may have a cloesd perimeter side 171 into which all of the ports extend inwardly. These body sections 170, 234 and 152 each has a closed perimeter side wall, and end constructions which seal against the adjacent body section.

The engine safety control 100 of this invention is designed to provide a self-contained safety system for installation on small engines and the like, such as engine 116. Provisions are made for mounting the safety control 100 directly on the engine and, therefore, compact and rugged construction as well as inexpensive design are achieved by this invention.

The safety control 100 is provided three separate connections or ports 101, 102, and 103 to provide three separate connections 104, 105 and 106 respectively to conduct instrument air or any control fluid to a plurality of transmitters or sensing members 107, 108, and 109, or more. A plurality, such as three indicators or more, 111, 111a and 111b indicate the condition of the particular variable engine condition being monitored or sensed by the transmitters 107, 108 and 109, or more. For example, any of the indicators may show red when its respective condition is unsafe and green when its condition is safe.

The unitary controller 100 is designed basically as a manually-operated system or construction under the control of the manipulator construction, including the push button 114. The push button 114 may be located at the top of the controller, if desired, for manually connecting the supply port S to the control port C and for a blocking or closing the passages to the vent V. One of the monitoring or sensing members 107 may be connected to the port 101, and may sense the lubricating oil pressure of the engine 116, and may open in response to unsafe, low, lubricating oil pressure. Another monitoring transmitter or sensing member 108 may monitor or sense the engine speed and may open in response to unsafe or excess speed. Another monitoring or sensing member 109 may monitor or sense jacket water temperature, and may open in response to unsafe or excessive water temperature. The gas engine 116 will be stopped in the event that any one of these three or more variable conditions should reach unsafe limits.

Instrument air or control fluid may be supplied to the port S at from 20–75 p.s.i. from the supply member or reservoir 118. The control port C is connected by passageway 122 to the actuator 124 of a safety shut down valve 126 in the gas supply line 128 to the engine 116. The safety shut down valve 126 is normally closed, but is opened when it receives instrument air or gas under operating pressure in the actuator 124. When the valve 126 is opened, fuel gas, oil, gasoline, or the like, will be supplied from the supply reservoir or source 130.

Therefore, with the ignition system 132 ungrounded, by the open switch 145, and the engine 116 being cranked by cranking motor 133 on starting air from the manually opened cranking air line 134, if the reset button 114 is depressed, the gas valve 126 is immediately opened by the operation of the controller 100, and fuel gas or the like is supplied to the engine 116. The reset button 114 is manually held down until the lubricating oil pressure acting on sensor 107 increases to a safe level. The speed responsive valve or sensor 108 will not be opened at this time, since the engine will not be at over speed, and will be in a safe condition. It is also necessary that the water jacket temperature in the water jacket 136 be below the temperature which is selected to open the temperature sensing valve 109, and this generally is the case when the engine is being started. After the lubricating oil pressure is safe, that is, sufficiently high, the reset button 114 can be manually released but will remain latched in its reset position and the control fluid supply will remain connected under pressure to the fuel control valve 126 until one of the three engine conditions variables becomes unsafe.

The lubricating oil transmitter or sensing member 107 is open when there is no substantial lubricating oil pressure, such as when the engine has just been started, and the lubricating oil pump 138 has not had time to build up the lubricating oil pressure. Under these conditions, the unitary controller 100 will sense the equivalent of an unsafe lubricating oil condition, and will, therefore, try to respond by turning off the fuel gas at the valve 126. However, it is possible to provide a lockout valve 140 in the proximity of the lubricating oil pressure sensor transmitter 107 which will prevent such low lubricating oil pressure from venting the system at 104A during the start up period when the oil pressure is low. The lockout valve 140 is normally open when it receives no starting air pressure through the air line 143 but is closed when it receives such pressure. During the initial cranking operation, when the cranking air line 134 has been activated by the opening of the hand valve 142, then the lockout valve 140 is closed during the cranking period, and prevents any venting of the air pressure in line 104 by the fact that the oil transmitter valve 107 is opened because of low oil pressure during the cranking operation. Hence, when it is desired to start the engine, and the starting air line 134 has been energized by opening valve 142, it is then only necessary manually to depress the reset button 114 momentarily and this feeds instrument pressure air or gas into the line 122 and opens the fuel oil valve 126. The push button 114 need not be manually held down sufficiently long to allow the lubricating oil pump 138 to build up the lubricating oil pressure to a safe pressure.

The lockout valve 140 prevents the oil transmitter 107 from venting the instrument air pressure at 104A, so the operator is free to release the reset button after it has been pressed down momentarily. It is only necessary to permit the starting air valve 142 to remain open until the lubricating oil pressure has become safe and has closed the transmitter 107. Thereafter, the starting air valve 142 may be closed, which will cause the lockout valve 140 to open and permit the oil transmitter valve to be in readiness to respond to any subsequent unsafe drop in lubricating oil pressure, and thereby to stop the engine in response to such unsafe condition.

The unitary control 100 may be provided with a base 152 which has three extensions 154 with openings 153 for mounting purposes. The central portion 156 is machined in such a way as to provide a guide 157 for the supply poppet valve assembly 158 as shown in FIGURE 3. The central portion 156 also provides a cavity 160 which contains the poppet return spring 162.

The cavity 160 is of such a size to provide for clearance at 163, FIGURE 3, about the poppet valve head 164, so that air entering the central cavity 160 from supply connection S, FIGURE 5, is free to flow through clearance 163 to the control connection 166, FIGURE 4, and to the control port C.

Instrument or control air is supplied from the reservoir or other supply 118 to the supply connection S in the body housing 170. The body housing 170 may be made from stock which has a hexagonal cross section as indicated in FIGURE 6, in which all of the ports, such as supply port S, control port C, vent port V, as well as the transmitter or sensor ports 101, 102, and 103 are located.

The bottom body housing or base 152 is provided with a horseshoe-shaped recess 174, shown in dotted lines in FIGURE 6, which is connected by passage 175, FIGURE 4, to the control port C.

The central body housing 170 is provided with three equally spaced cavities 176, FIGURES 3-6, in which are located the piston assemblies 178. These cavities 176 are connected to recess 174. Each piston assembly 178 is provided with a stem 180 which extends out of the top of the body housing 170 for purposes which will be described later. Each of the pistons 182 are provided with an orifice 184 and an O ring 186 to seal at its periphery. A piston return spring 188 is also located in cavity 176 to bias the piston 182 against a stop 190 which is provided in the bottom housing or base 152. A shoulder 192 is also provided on each piston 182 to properly locate the spring 188.

The top end 193 of cavity 176 is made in such a way as to receive an O ring seal 194 which is held in place by means of spring seat 196. The spring seat 196 is made with a shoulder properly to locate the opposite end of spring 188.

The recess 174 is made in a horseshoe shape, as shown in FIGURE 6, to encompass and connect with the three piston cavities 176. However, it does not completely encircle the top surface of the body housing or base 152 to permit the supply passage 198, FIGURES 5 and 6, to connect from the supply connection S to the central cavity 160.

The central body housing 170, FIGURE 3, is provided with a vent connection or discharge V and a passageway 199 connecting the vent connection or port V with the recess 200.

The central portion of housing 170 is provided with a supply valve seat 202, FIGURE 5, and the central cavity 166. The upper end of cavity 166 has a reduced section 240 which forms a guide for the manipulator stem or shaft assembly 206, and, in conjunction with the washer 208 and the O ring 208' forms a seal to prevent leakage from the cavity 166 to recess 200. Located in recess 200 is a sealing gland or metal tube member 212 to receive an O ring 213 as shown to prevent leakage from the recess 200 to the atmosphere.

Sealing gland 212 is made in such a way that when held in place by bottom plate 216, the gland 212 in turn holds washer 208 in its proper location. The central portion 215 of the sealing gland 212 provides a guide for the stem assembly 206. The O ring 214 is used to seal between the gland 212 and the stem assembly 206. The gland 212 has a notch 217, FIGURE 3, for connection with passage 199 and with a hole or slot 306 in the hollow portion 290 of manipulator stem of shaft 206 to provide proper venting of the system into vent port V at the proper time.

The manipulator stem assembly 206 is provided with a shoulder 218 which serves as a spring seat for the stem return spring to bias the manipulator to its upper released position of FIGURE 8. The opposite spring seat for spring 220 is at the bottom plate 216. This spring 220 is located by means of a shoulder 222 on the sealing gland 212. Above the shoulder 218 on stem 206 is located a second shoulder 224 which serves as a stop for the ball 226. The ball 226 is provided with a central opening through which the stem 206 is assembled and held in place by means of sleeve 228 which is locked in place when the knob or push botton 114 is positively locked on the upper end of the manipulator shaft 206 by means of one or more set screws 230, FIGURE 3.

As described above, the plate 216 holds the gland 212 down. The plate 216 is firmly attached to the top body section 170 with three equally spaced spacer relatively thick studs 230 which are threaded into the top body section 170. The opposite ends 231 of the spacer studs 230 are each provided with a threaded hole which receives the screw 232. The screws 232 form a means for attaching the cover 234 and name plate 236 which are assembled together by means of the screws 232. The three screws 231 pass through close fitting openings in disc 238, as shown in FIGURES 4, 5 and 7. The relatively thick spacer studs 230 form limits on the under side of the disc 238, FIGURES 3, 4 and 5, to prevent the disc 238 from tilting too far from a horizontal position. Therefore, when the push button 114 is depressed or reset to its lowest possible position, which is below any shown in FIGURES 3, 4 and 5, the tension springs 260 will latch the shoulders 258 over the edge of the disc 238. This occurs when the push button 114 of FIGURE 8 is pushed down to the lowest reset position when the shoulder 258 of lever 251 will be pulled over the edge of the disc 238 by the tension springs 260 when the disc 238 is pushed down to its lowest reset position by the push button 114.

The purpose of the ball 226 is to act as a pivot bearing for the latching disc 238 whose central portion 237, FIGURE 5, is formed in a spherical shape with a hole at the center to permit free movement between the ball 226 and the disc 238. To hold the latching disc 238 to the ball 226, retainer plate 240 is made in much the same manner as the central portion of latching disc 238, and is riveted through latching disc 238 with rivets 242. This assembly then permits the latching disc to pivot freely about the ball 226 at any angle desired. The purpose of this is that the latching disc will be freed whenever any one of the three latching levers 250, 251, 252 releases the latching disc 238, as shown in FIGURE 8.

The bottom plate 216 is also held down with three additional screws 246, FIGURES 5 and 7, which also serve as a clamping means for firmly anchoring pivot blocks 248 to the base plate 216.

These screws 246 and pivot blocks 248 are so located that three latching levers 250, 251, and 252 may be attached to the side of the respective pivot block 248 by means of a rivet 253. Each of the latching levers 250, 251, 252, may have an ear, flange or the like 254 which is directly over the stem portion 180 of the piston construction 178. The latching levers 250, 251, and 252 may also be indicated levers and are made in such a way as to pivot freely about the rivets 253. The latching, indicator levers 250, 251 and 252 are engaged by screws 255 and notches 255', FIGURES 4 and 12, for attaching the respective indicator flags 111, 111a, 111b at the top end of the levers. A relatively short latching shoulder 258 is also provided on each of the latching levers 250, 251 and 252 which, when the levers are rotated toward the center of the control are effectively engaged or latched over the outer edge 259 of the disc 238. Three tension springs 260 are each connected to two of the three levers 250, 251 and 252 and are used to bias these levers toward the center of the assembly and into a position that they may all engage and latch the arms 261 of the levers 250, 251 and 252. The disc 238 never rises above the arms 261 of the levers 250–252.

The covers 234 and 236 are provided with three openings 262 in each of which is assembled a window retainer 264. The window constuctions are provided with rectangular openings 266 and into which can be inserted a window 268 of glass, plastic or the like. A portion of each of the indicator flags 111, 111a, 111b is painted green as at 270 and another portion is painted red, FIGURE 4, as at 272. The name plate 236 is made in such a manner as to entrap a dust seal 274 at the center of the controller.

The outer edge 275, FIGURE 3, of the bottom plate 216 is turned up and formed as at 275 in such a manner as to retain a gasket 276 which also serves as a dust seal for the top cover portion of the assembly.

Figure 9:
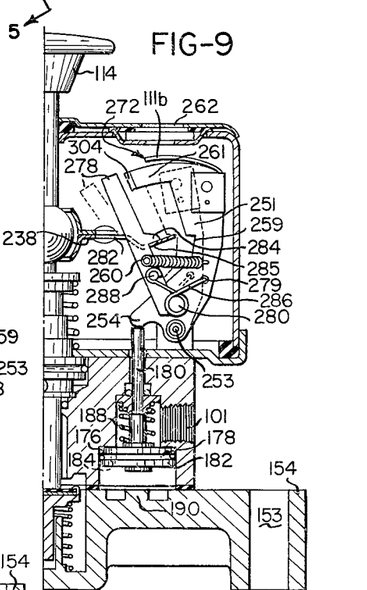
FIGURE 9 shows a view similar to a portion of FIGURE 4, for example, with an auxiliary lock out lever.

As shown in FIGURE 1 a lockout valve 140 may be used adjacent to the lubricating oil transmitter or sensing device 107 which, in effect, prevents the lubricating oil pressure transmitter 107 from actuating the controller 100 to close off the supply of fuel gas in line 128 by means of the safety gas valve 126 for a predetermined time. However, in the event that it is desired to omit such a lockout valve 140 other means, as shown in FIGURES 9 and 10 may be alternatively used. When lubricating oil pressure, or any other variable engine condition which depends for its value on an engine driven device, is to be monitored or sensed without the provision of such a lockout valve 140 or the like, an auxiliary lever 278, FIGURES 9 and 10, is attached to the lever 251 (or any of the other two or more levers) by means of a shoulder rivet 280. The auxiliary lever 278 passes through a slot 282 in the latched disc 238 and is provided with a notch or detent 284 which is capable of latching the disc 238 much in the same manner as was described with the indicator lever 251, except that the detent 284 engages the outer edge 285 of the slot 282 instead of the outer edge 259 of the entire disc 238. A torsion spring 286 is mounted about the rivet 280 and is fastened to the auxiliary lever 278 by means of the rivet 288 and is attached to the indicator lever 251 by a hole or the like 279 and biases the auxiliary lever 278 to rotate about the rivet 280 clockwise, in FIGURES 9 and 10, to latch the disc 238. The operation will be further described later. In the event that this lever 278 is used, it is then necessary for the lubricating oil pressure transmitter or sensor 107 once to be subjected to high or safe lubricating oil pressure, that is to be brought once to a safe condition, by running engine speed, before the lever 278 is capable of permitting the lubricating oil pressure transmitter or sensor 107 to stop the engine 116. When the oil pressure rises, the sensor valve 107 is closed, the piston 182 is caused to be lowered and the lever 251 is rocked counterclockwise to push the lever 278 to the position of FIGURE 10 with lever 251 in control of the disc 282 ready to stop the engine if the oil pressure should drop. Any one of the three or any combination of the three indicating levers 250, 251, and/or 252 may be provided with such an auxiliary lever 278.

In operation, if it is desired to start the engine 116 when provided with this controlling system, the starting air valve 142 is first turned on with the ignition system grounded by closing switch 145 which causes the engine to turn without ignition while being driven by the cranking motor 133 for a time sufficient to purge the engine of all residual gas etc. With the assumption that the supply poppet valve 164, FIGURE 8, is on the seat 202 with the disc 238 unlatched when the engine safety control 100 is ready for resetting, and with the push button 114 at in its high, released position, as is shown in FIGURE 8, then the push button 114 is depressed to its lowest position, which is lower than any of the positions shown in FIGURES 3, 4 and 5, and which pushes the knob stem 206 and disc 238 down to close off or isolate the vent port V, FIGURE 3, from the instrument air system and to open the supply poppet valve 164 to supply instrument air from supply 118, FIGURE 1, through port S, FIGURE 5, into the system. The vent port V is closed off when the lower end 291 of tube 290, FIGURE 3, which is attached to the lower end 292 of the stem 206 is pushed down against the seal 294 of poppet valve 164 to seal off the tube 290 from the instrument air supply. Instrument air is then free to flow from the supply port S, FIGURE 5, through the passageway 198 into the cavity 160 past the valve seat 202 into passages 166 and 167, FIGURE 4, and out the control port C to the diaphragm actuator 124, FIGURE 1, of the safety fuel gas valve 126. As the control port C becomes pressurized, the instrument air is free to flow through passage 175, FIGURES 4 and 6, and into the horseshoe shaped passageway 174 to the underneath side of each of the piston asemblies 178 and immediately forcing the pistons 182 in an upward direction until the shoulder 298, FIGURE 4, provided on the stem portion 180 of the piston engages the stop 300 provided by the spring seat 196. At this instant, the upper ends of the piston stems 180 engage the extensions 254 of the levers 250–252 and the red portion 172 of the indicator flags 111, 111a and 111b will be seen through the window 268. In FIGURE 1, as the lines 104, 105 and 106 to the three transmitters or sensors 107, 108 and 109 become pressurized, the pressure begins to build up on opposite sides of the piston assemblies 178 by the slow leakage of instrument air through the orifices 184 to an extent that the springs 188 move the pistons 182 down against the stops 190. The tension springs 260 which are inter-connected to the three indicator levers 250, 251 and 252 bias these indicator levers to an inward position so each lever is forced to latch the disc 238 while the knob 114 is in its downmost position.

When a lockout valve 140 is used, and the starting air from supply or storage tank 144 having been turned on by the manual of valve opening 142 to crank the engine, the line 143 is also pressurized. This will close the lockout valve 140 and therefore blocks out the line 104 against the venting action of the valve 107. Therefore, even though the lubricating oil pressure in line 139 is in a low pressure condition during the slow engine starting condition, it will permit the indicator lever 151, FIGURE 4, to latch the disc 238 and the green signal 270 can be seen through the window 266. As the green signals appear in all three windows 266, the reset button 114 can be manually released, but will be held in the latched positions shown in FIGURES 3, 4 and 5, because the disc 238 is latched by all three levers 250, 251 and 252. The supply port S will remain connected to the control port C with the sensor ports 101, 102 and 103, with the vent port V isolated. This will maintain the fuel gas valve 126 in open position and will feed fuel gas or other fuel to the piston-cylinder assembly 146 of the engine 116.

After a suitable time, the starting air may be manually turned off by closing valve 142. By this time, the lubricating oil pressure in line 139 should have built up to a safe level because of suitable engine speed so that even though the lockout valve 140 is opened by the loss of starting air pressure in line 143, the transmitter or sensor 107 has been closed in response to the high or safe lubricating oil pressure in pipe 139 which has now been built up by the now fast running engine. The engine is now running and is being monitored or guarded by all three transmitters or sensors 107, 108 and 109 so that any one of the transmitters or sensors 107, 108 or 109 may be in readiness to stop the engine should its respective variable engine condition become unsafe.

Where it is desired not to use a lockout valve 140 in a connection such as between the controller 110 and the transmitter or sensor 107, then the auxiliary lever 278, FIGURES 9 and 10, may be used in combination with the particular indicating lever 251 which is controlled by such sensor 107.

When the push button 114 is pushed down and is held down long enough to pressurize the control system, and the engine 116 is being cranked, the auxiliary lever 278 temporarily latches the disc 238 at 285, FIGURE 9, in combination with the latching action of the remaining two indicating levers 250 and 252 to hold the disc even if the push button 114 is released while the lubrication oil pressure in line 139 is in a low or unsafe condition during cranking of the engine. If the operator releases the push button 114 at this time and looks at indicator 111b, he will note that it shows the red flag, but the push button will be latched in the down position for the following reason.

The lever 278 will latch the disc 238 by means of a detent 284, as shown in FIGURE 9, during the engine cranking action when the lubricating oil pressure in line 139 is low and while the instrument air line 104 is being vented at 104A to the atmosphere by open sensor 107. The indicating lever 251 is rocked to its rightmost position by plunger 180 by the piston assembly 178 during that time so lever 251 cannot latch the disc 238. The lever 251 will hold the red part of the indicator 111b in that position until the engine has been started at running speed.

When the engine has been started and reaches running speed and the lubricating oil pressure has risen to be sufficiently high and safe, the sensor valve 107 is closed by such oil pressure and the instrument air pressure in line 104 builds up and causes the piston assembly to be lowered to permit lever 251 to return leftwardly to the position of FIGURE 10. The lever 251 then pushes the auxiliary lever 278 leftwardly by means of flange 304 on extension 261 to the position of FIGURE 10 so the lever 278 does not latch the disc 238 at 285 and the lever 251 will latch the disc 238 at 259. The lever 251 will then show the green indicator and will thereafter be ready to respond to any future unsafe low lubricating oil pressure and can trip the controller 110 and stop the engine by releasing the disc 238 and venting the control system at port V, as elsewhere described.

In operating the embodiment of FIGURES 9 and 10, the operator presses down on the reset button 114 and the pressure is built up in the control port C and to the underneath side of the piston assemblies 178, as previously described. This pressure will press the piston 182 up and the indicator lever 251 to the right, FIGURE 9, to show the red position 272 or unsafe condition of the lubricating oil in window 262 because the port 101 and passage 104 will be vented to the atmosphere at 104A and produce low pressure above the piston 182 because valve 107 will be in its normally open condition in response to low oil pressure at 139. The lever 251 will be moved rightwardly sufficiently out of the way so it can not latch the disc 238. However, the auxiliary lever 278, being biased clockwise by the spring 286, will be forced into a position so that its detent 284 will then engage the disc 238 at 285, FIGURE 9, and hold the disc 238 and push button stem assembly 206 in fully latched condition by the combined action of levers 278, 250 and 252. The supply port S will then be maintained connected to the control port C to attempt to pressurize the entire control air system. However, during the engine starting time, the normally opened lubricating oil pressure transmitter or sensor 107 will be venting the instrument air at 104A and a red signal will show at the top of latching lever 251 in FIGURE 9. After the lubricating oil pressure increases in line 139 when the engine is fully started, to render the lubricating oil pressure transmitter 107 in closed position, the pressure drop across the piston orifice 184, FIGURE 9, is reduced and the piston 182, and the return spring 188 forces that piston 182 down against stop 190. The tension springs 260, FIGURE 7, are of sufficient strength to return the lever 251 to its inward position so that with the retraction of the piston assembly 178 of lever 251 an outwardly turned ear or flange 304 on extension 261 of indicator lever 251 engages the auxiliary lever 278 and forces it back as shown in FIGURE 10 so the detent 284 of lever 278 disengages the disc 238 at 285 so the disc 238 is then free to move upwardly slightly and engage the latch or detent 258 on the lever 251. Therefore, it can be seen that with the use of the auxiliary lever 278 the lockout valve 140 is not necessary.

However, it is necessary for the operator to monitor or consider this particular point to make sure that the lubricating oil pressure has reached a safe limit by proper starting of the engine before he leaves the controller after having momentarily pushed down and released the knob 114 before such safe oil pressure has been reached. This is necessary, since the lubricating system may not be operative, and the engine should not be allowed to run. However, once the lubricating oil pressure has reached a safe limit, and the auxiliary lever 278 has been disengaged by the indicator lever 251 as just described, lever 251 acts in a normal manner and is free to monitor or sense the lubricating oil pressure and to guard and stop the engine if any drop in oil pressure is not safe.

To illustrate further, in the event that the lubricating oil pressure in line 139 were to drop below its safe point, the transmitter at 104A or sensing valve 107 would open and vent the line 104 at 104A to the atmosphere. With the loss of instrument air pressure at the port 101, a pressure drop, maintained by orifice 184 would then exist across the piston assembly 178 of FIGURE 9 causing assembly 178 to move upwardly so the stem 180 would engage the extension 254 of lever 251. This would pivot the lever 251 clockwise about the pivot 253 to unlatch disc 238 and permit the disc 238 to rise, since it can be released by any one of the arms 250, 251 and 252, because of its support in the ball 226, as shown in FIGURE 8. Therefore, the manipulator shaft or stem 206 can return upward to its released position of FIGURE 8, which is higher than the positions shown in FIGURES 3, 4 and 5, permitting the seal surface 294 of poppet valve 164 to be closed against seat 202 by spring 162 to block or isolate supply port S from the other ports of the system including vent port V as shown in FIGURES 8 and 11. The tube 290 of manipulator shaft or stem 206 also rises to its highest position so its lower end 291 is above seal surface 194, as shown in FIGURES 8 and 11, but no supply air can be introduced in the tube 290 from the supply source S because of the sealing of the poppet seal surface 294 on seat 202. The instrument air control pressure which previously existed at the port C, and in the remaining control system including passages 174 and 175, is lost or vented at vent port V as shown in FIGURE 11. The lower end 291 of tube 290 has been raised above seal surface 294 to produce an opening at 293 so the control air pressure can pass out through a slit 306 past the notch 217 in gland 212 and out the passageway 199 and vent port V to the atmosphere. Since the control pressure is lost in the distributing passage 174 on the bottom side of the pistons 182 of FIGURES 3, 4 and 5, they return to the stop 190. However, the disc 238 has moved off one or more of the detents 258 and moved upward to such a position that the indicator flag will remain with the red position 172 at the window 262, because the disc 238 will be engaged the thick part 308, FIGURE 8, of any outwardly moved latch lever 250, 251 or 252 to maintain the red coloring at the window even after stem 180 of the piston 182 moves down under pressure from spring 188. The control pressure is also lost on the other two pistons such as shown in FIGURES 3, 5 and 8. However, since the levers 250 and 252 are latched by the disc 238 they cannot unlatch, and will continue to show a green signal, even when the entire control system air pressure has been vented at port V.

The same action would occur if any one of the three or more transmitters or sensors 107, 108 and 109, shown in FIGURE 1, were to reach an unsafe limit.

As described previously, it is pointed out that with the use of auxiliary lever 278, it is necessary for the operator to determine that the lubricating oil pressure has reached a safe value, by the display of all three green flags.

The auxiliary lever 278, of course, could be used to monitor or sense any variably condition desired. The lever 278 can be used with each of the indicator levers 250, 251 and 252, if so desired. It also can be seen that a lockout valve, such as lockout valve 140, can be used in conjunction with the transmitter 107 or any other transmitter, such as 108 and 109.

In FIGURE 12, the cover assembly 234, name plate 236, indicator window 268, window retainer cup 267, and gasket 269 may be held together by screw bolts 271. There may be a similar screw bolt construction at each of the three windows 268.

These screw bolts 268 may hold together, as an assembled unit, the cover assembly 234, name plate 236, indicator windows 268, window retainer cups 267 and gasket 269. This assembled unit may be lifted off as a unit when the screws 232 are removed from the ends 231 of the spacer studs 231, FIGURES 3, 4 and 5.

The engine may be stopped by other means than the controller 100. For example, the ignition may be manually shorted, or the fuel line may be manually closed, or any other engine stopping action may occur. Under these conditions the lubricating oil obviously will drop and cause the control system to be shut down and the control button 114 to be released upwardly.

Also the instrument air from supply 118 might be closed off or vented manually with a manually operated valve, not shown. This will cause the engine to stop with all the indicators retaining their green signal. The operator, who may be involved with some other duty, such as other of these devices, can be certain that the engine was stopped with other means than an unsafe transmitter.

A new and useful engine control system and a new and useful unitary controller have been provided.

While the form of the invention now preferred has been disclosed as required by statute, other forms may be used, all coming within the scope of the claimed subject matter which follows.

What is claimed is:

1. A unitary controller means with its parts assembled together and to be connected to an engine as a unit and having a control body construction having a control fluid supply port on said controller body, a plurality of control fluid discharge ports on said controller body, a control fluid discharge fluid control port on said controller body, and a control fluid discharge vent port on said controller body, a conduit construction in said controller body connecting said ports, a valve construction means in said controller body controlling said conduit construction to connect said supply port with said sensor ports and said fuel control port while isolating said vent port in a first valve construction means condition and causing said conduit construction to connect said vent port with said sensor ports and said fuel control port and while isolating said supply ports in a second valve construction means condition, single manipulator means carried by said controller body and biased from a set position to a released position wherein it places said valve construction means in said second valve construction means condition, said manipulator means being manually movable to reset said manipulator means to said set position to place said valve construction means in said first valve construction means condition, latch means in said controller body to latch said manipulator means in said set position, and pressure responsive means in said controller responsive to a drop in control fluid pressure in any of said sensor ports to cause said latch means to release said manipulator means to released position, and wherein said manipulator means includes a longitudinally movable axial shaft on said controller body construction and said latching means includes a plurality of radially fulcrumed latch levers in said controller body construction and which are radially fulcrumed to move in radial planes which are radial to said shaft, and which levers surround said shaft and are inwardly spring biased and are outwardly movable by said pressure responsive means.

2. A unitary controller means with its parts assembled together and to be connected to an engine as a unit and having a control body construction having a control fluid supply port on said controller body, a plurality of control fluid discharge ports on said controller body, a control fluid discharge fluid control port on said controller body, and a control fluid discharge vent port on said controller body, a conduit construction in said controller body connecting said ports, a valve construction means in said controller body controlling said conduit construction to connect said supply port with said sensor ports and said fuel control port while isolating said vent port in a first valve construction means condition and causing said conduit construction to connect said vent port with said sensor ports and said fuel control port and while isolating said supply ports in a second valve construction means condition, single manipulator means carried by said controller body and biased from a set position to a released position wherein it places said valve construction means in said second valve construction means condition, said manipulator means being manually movable to reset said manipulator means to said set position to place said valve construction means in said first valve construction means condition, latch means in said controller body to latch said manipulator means in said set position, and pressure responsive means in said controller responsive to a drop in control fluid pressure in any of said sensor ports to cause said latch means to release said manipulator means to released position, and wherein said manipulator means includes an axial shaft and a plurality of radially fulcrumed latch levers in said controller body and which are radially fulcrumed to move in radial planes which are radial to said shaft, and which levers are inwardly spring biased and are outwardly movable by said pressure responsive means and in which said axial shaft universally movably supports a universally supported latching disc in said controller latched and unlatched by said fulcrumed latch levers.

3. A unitary controller means with its parts assembled together and to be connected to an engine as a unit and having a control body construction having a control fluid supply port on said controller body, a plurality of control fluid discharge ports on said controller body, a control fluid discharge fluid control port on said controller body, and a control fluid discharge vent port on said controller body, a conduit construction in said controller body connecting said ports, a valve construction means in said controller body controlling said conduit construction to connect said supply port with said sensor ports and said fuel control port while isolating said vent port in a first valve construction means condition and causing said conduit construction to connect said vent port with said sensor ports and said fuel control port and while isolating said supply ports in a second valve construction means condition, single manipulator means carried by said controller body and biased from a set position to a released position wherein it places said valve construction means in said second valve construction means condition, said manipulator means being manually movable to reset said manipulater means to said set position to place said valve construction means in said first valve construction means condition, latch means in said controller body to latch said manipulator means in said set position, and pressure responsive means in said controller responsive to a drop in control fluid pressure in any of said sensor ports to cause said latch means to release said manipulator means to released position, and wherein said pressure responsive means includes a plurality of pistons in said controller body with each piston being responsive to a drop in control fluid pressure in a respective sensor port.

4. A unitary controller means with its parts assembled together and to be connected to an engine as a unit and having a control body construction having a control fluid supply port on said controller body, a plurality of control fluid discharge ports on said controller body, a control fluid discharge fluid control port on said controller body, and a control fluid discharge vent port on said controller body, a conduit construction in said controller body connecting said ports, a valve construction means in said controller body controlling said conduit construction to connect said supply port with said sensor ports and said fuel control port while isolating said vent port in a first valve construction means condition and causing said conduit construction to connect said vent port with said sensor ports and said fuel control port and while isolating said supply ports in a second valve construction means condition, single manipulator means carried by said controller body and biased from a set position to a released position wherein it places said valve construction means in said second valve construction means condition, said manipulator means being manually movable to reset said manipulator means to said set position to place said valve construction means in said first valve construction means condition, latch means in said controller body to latch said manipulator means in said set position, and pressure responsive means in said controller responsive to a drop in control fluid pressure in any of said sensor ports to cause said latch means to release said manipulator means to released position, and wherein said pressure responsive means includes a plurality of pistons in said controller body construction with each piston being responsive to a drop in control fluid pressure in a respective sensor port, and in which each of said pistons is reciprocable in a respective cylinder in said controller and has a control fluid bleed orifice independent of said respective cylinder and in which each piston is spring biased by spring means in said controller against movement by drop in pressure in said control fluid.

5. A unitary controller means with its ports unitarily assembled together and to be connected to an engine as a unit and having control body construction having a control fluid supply port on said controlling body construction, a control fluid discharge latch controlling port on said controller body construction, and a control fluid discharge vent port on said controller body construction, a conduit construction in said controller body construction connecting said ports, a valve construction means in said controller body construction to connect said supply port with said latch controlling port while isolating said vent port in a first valve construction means condition and causing said conduit construction to connect said vent port with said latch controlling port while isolating said supply port in a second valve construction means condition, single manipulator means carried by said controller body construction and biased from a set position to a released position wherein it places said valve construction means in said second valve construction means condition, said manipulator means being manually movable to reset said manipulator means to said set position wherein it places said valve construction means in said first valve construction means condition, latch means in said controller body to latch said manipulator in said set position, and pressure responsive means in said controller responsive to a drop in control fluid pressure in said latch controlling port to actuate said latch means to release said manipulator means for return to said released position and wherein said controller body construction has a plurality of said latch controlling ports all of which are connected to said supply port in said first valve construction means condition and to said vent port in said second valve construction means condition and wherein said unitary controller body construction has a generally cylindraceous controller body with a side wall construction and with first and second end wall constructions, said ports being outwardly directed along said side wall construction, and wherein said manipulator includes an axially and longitudinally movable manipulator shaft controlling the fluid passage to the control ports of said controller body.

6. A unitary controller body construction according to claim 5 wherein said latch means includes a plurality of inwardly spring biased latch levers surrounding said shaft said levers being outwardly movable by said pressure responsive means, and said shaft having latch lever engaging means to be latched by said levers in manipulator reset position.

7. A unitary controller body construction according to claim 6 wherein any of said latch levers can release said shaft for return to released position.

8. A unitary controller body construction according to claim 7 wherein said latch lever engaging means is a disc movably mounted on said shaft.

9. A unitary controller body construction according to claim 5 wherein said valve construction includes a poppet valve longitudinally spring biased toward and engageable and disengageable by the end of said manipulator shaft.

10. A unitary controller body construction according to claim 9 wherein said poppet valve isolates said supply port when disengaged by said end of said manipulator shaft and said end of said manipulator shaft is hollow and connects said latch controlling ports to said vent port, and in which said poppet valve connects said supply port with said latch controlling ports and isolates said vent port when said poppet valve is engaged and moved against said spring bias by the end of said manipulator shaft.

11. A unitary controller body construction according to claim 10 wherein said controller body construction has a control fluid discharge port which does not actuate said latch means and is connected to said supply port in said first valve construction means condition and said vent port in said second valve construction means condition.

12. A unitary controller body construction according to claim 11 wherein said controller body construction has connections with an engine, said supply port is connected to a source of supply fluid, said latch controlling ports are connected to respective variable engine condition sensors which vent in response to engine conditions.

13. A unitary controller means with its parts unitarily assembled together and to be connected to an engine as a unit and having a control body construction having a central body section having a closed perimeter side, with a latch containing body section at one end and with a distributing conduit body section at the other end and having a distributing channel sealed by and adjacent said other end; a manipulator shaft passing through and being axially movable in said latch body section and said central body section; manipulator shaft latch means in said latch sections; outwardly directed port forming walls in said central body section and forming a control fluid intake supply port, a control fluid vent port, a fuel control connection port, and a plurality of control fluid sensor connector ports in said perimeter side; longitudinal piston cylinder walls in said central body extending from said distributing conduit body section to said latch body section; piston constructions in said piston cylinder walls having latch stems extending into said latch containing body section and operating said latch means; a central cavity in said distributing conduit section having a spring biased poppet valve said cavity being connected to said supply port, said manipulator shaft having a hollow shaft with one end of such hollow shaft engaging and disengaging said poppet valve and in one hollow shaft position connecting said supply port to said distributing conduit and at the same time disconnecting said vent port and disconnecting said vent port and said distributing conduit and in another hollow shaft position disconnecting said supply port from said distributing conduit and at the same time connecting said distributing conduit to said vent port.

References Cited by the Examiner

UNITED STATES PATENTS

| | | | |
|---|---|---|---|
| 1,965,372 | 7/34 | Drabelle | 123—179 |
| 2,499,319 | 2/50 | Lillquist | 123—179 |
| 2,565,984 | 8/51 | Newman | 123—198 |
| 2,714,883 | 8/55 | Metzger | 123—198 |
| 2,719,521 | 10/55 | King | 123—198 X |
| 2,731,001 | 1/56 | Dickson et al. | 123—198 X |
| 2,734,496 | 2/56 | Hammond | 123—198 X |
| 2,854,964 | 10/58 | Wagner | 123—198 |
| 2,960,082 | 11/60 | Smith | 123—179 |
| 3,043,321 | 7/62 | Hewitt | 123—198 X |
| 3,056,393 | 10/62 | Friddell | 123—198 X |
| 3,075,537 | 1/63 | Puster | 123—198 X |
| 3,107,693 | 10/63 | Puster | 123—198 |

RICHARD B. WILKINSON, *Primary Examiner.*